(12) United States Patent
Petolillo et al.

(10) Patent No.: US 10,399,173 B2
(45) Date of Patent: Sep. 3, 2019

(54) LASER WELDING OF WORKPIECES BY MACHINE

(71) Applicant: TRUMPF Laser- und Systemtechnik GmbH, Ditzingen (DE)

(72) Inventors: Stefano Petolillo, Vaihingen/Enz (DE); Andreas Vehlow, Marbach (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 551 days.

(21) Appl. No.: 14/980,227

(22) Filed: Dec. 28, 2015

(65) Prior Publication Data

US 2016/0107259 A1    Apr. 21, 2016

Related U.S. Application Data

(63) Continuation of application No. PCT/EP2013/001911, filed on Jun. 28, 2013.

(51) Int. Cl.
| | |
|---|---|
| *B23K 9/16* | (2006.01) |
| *B23K 26/14* | (2014.01) |
| *B23K 26/20* | (2014.01) |

(52) U.S. Cl.
CPC ............ *B23K 9/16* (2013.01); *B23K 26/1437* (2015.10); *B23K 26/206* (2013.01)

(58) Field of Classification Search
CPC ..... B23K 9/16; B23K 26/206; B23K 26/1437
USPC .................................................. 219/121.63
See application file for complete search history.

(56) References Cited

U.S. PATENT DOCUMENTS

| | | | | |
|---|---|---|---|---|
| 4,023,006 | A * | 5/1977 | West ................... | B23K 10/006 219/121.46 |
| 6,198,070 | B1 | 3/2001 | Nakayama | |
| 8,530,778 | B2 * | 9/2013 | Halvorsen .............. | B23K 9/067 219/130.21 |
| 2006/0060571 | A1 * | 3/2006 | Mori ...................... | H01S 3/134 219/121.62 |

(Continued)

FOREIGN PATENT DOCUMENTS

| | | |
|---|---|---|
| CN | 102033511 | 4/2011 |
| CN | 103111767 | 5/2013 |

(Continued)

OTHER PUBLICATIONS

International Search Report from corresponding PCT Application No. PCT/EP2013/001911, dated May 21, 2014, 4 pages.

*Primary Examiner* — Brian W Jennison
(74) *Attorney, Agent, or Firm* — Fish & Richardson P.C.

(57) ABSTRACT

A method for machine processing, in particular for machine welding processing of workpieces, in particular of plate-like workpieces, tubes and/or profiles, by means of a thermal processing beam, in particular by means of a processing beam is described, wherein the processing of the workpiece is carried out with a relative movement between the processing beam and the workpiece, wherein a process gas is fed to a processing zone in a settable quantity of process gas per unit of time. After a stored stabilization time, in which the processing of a workpiece is continued with a relative movement between the processing beam and the workpiece, a quantity of process gas per unit of time is automatically reduced. Further a control apparatus of a setting device for process gas feed according to such a method is described.

10 Claims, 3 Drawing Sheets

(56) References Cited

U.S. PATENT DOCUMENTS

2007/0051709 A1* 3/2007 Lambert .............. B23K 26/123
219/121.84
2009/0134132 A1* 5/2009 Verna ................. B23K 26/1476
219/121.64

FOREIGN PATENT DOCUMENTS

| | | |
|---|---|---|
| DE | 3827451 C1 | 10/1989 |
| DE | 3824048 A1 | 5/1990 |
| JP | H09267186 | 10/1997 |
| JP | 2010042430 | 2/2010 |
| JP | 2011036883 | 2/2011 |
| KR | 20000011883 | 2/2000 |
| KR | 20100118429 | 11/2010 |
| WO | WO 2008/091160 | 7/2008 |

* cited by examiner

LASER WELDING OF WORKPIECES BY MACHINE

CROSS-REFERENCE TO RELATED APPLICATIONS

This application is a continuation of and claims priority under 35 U.S.C. § 120 to PCT Application No. PCT/EP2013/001911 filed on Jun. 28, 2013. The contents of that priority application is hereby incorporated by reference in its entirety.

TECHNICAL FIELD

The invention relates to machine processing, in particular for machine welding, of workpieces, in particular of plate-like workpieces, tubes and/or profiles, by means of a thermal processing beam, in particular by means of a laser beam.

BACKGROUND

Process gas, particularly in the case of laser welding processing, is fed to a processing zone for machine processing, for example, of a gas nozzle. The process gas can serve mainly to shield a processing point in the processing zone from the ambient air. As an example, by so doing the material melted by the processing beam is prevented from reacting with surrounding air. In this case, the process gas acts as a protective gas, therefore. The protective gas used is an inert gas such as helium, argon or carbon dioxide. Depending on the application, process gas mixtures with several process gases are used also.

But a process gas can also be fed to the processing zone, which is intended to react with the workpiece material and by so doing introduces additional energy into the processing zone. In this case, the process gas serves as a working gas.

Furthermore, a process gas can be fed in addition or as a supplement to the processing zone in order to protect parts of the processing machine from emissions from the processing point. In laser processing, process gases of this type are used, for example, to protect optical elements in the vicinity of the processing point (cross jet gas).

Overall, the process gas feed and, for example, also the resulting removal of the emissions has a decisive effect on the machining process and largely determines the quality of the processing result.

A device for processing workpieces by a laser processing beam is described by DE 38 27 451 C1, which device is characterised by a particularly dynamically controllable process gas feed.

It is known, therefore, from DE 38 24 048 A1, in a method for processing workpieces with a laser processing beam to control the supplied quantity of process gas per unit of time based on the acoustic and optical monitoring of the processing zone. In the previously known method, stored process diagrams are accessed, by means of which desired values for the process gas feed are determined.

SUMMARY

Various embodiments of the invention provide a method for machine processing, or, respectively, a control apparatus for a setting device of a process gas feed, which enables the consumption of a process gas to be reduced without lowering the quality of the processing results and without resorting to expensive control devices.

In one aspect, the invention features a method for machine processing comprising, at the start of processing a workpiece, feeding a quantity of process gas per unit of time, which is set based on an initially stored first specified value. After a stored stabilization time in which the processing of a workpiece is continued with a relative movement between the processing beam and the workpiece, the quantity of process gas per unit of time is reduced automatically. This takes place by supplying a quantity of process gas per unit of time, which is set based on a stored, second smaller specified value.

Due to the automatic reduction of the quantity of process gas per unit of time supplied after a predetermined stabilization time, a substantial saving of process gas can be achieved. The invention is based on the knowledge that, in a continuous machining process in which a processing beam is moved relative to a workpiece, at the start a relatively high amount of processing is required. After an initial period, the machining process stabilises. A certain amount of molten metal has built up. A sufficiently large gas cushion envelopes the processing point. Overall, gas flows, etc., have stabilised themselves. In addition, the invention makes use of the knowledge that these stabilization times largely agree with each other in similar processing operations. In similar processing operations or applications, processing operations should be understood to mean those which have essentially the same processing parameters comprising, for example, workpiece properties, weld seam geometry, processing speed, nozzle geometry etc. Costly monitoring and control devices are not needed to achieve a significant saving of process gas. The specified values and the stabilization time can be determined by trials and stored for the automatic control of a later processing operation.

The specified values and stabilization time can be stored in a number of different ways. They can be stored directly as values in terms of the quantity of process gas per unit of time, for example, in the form of a volumetric flow value or of a mass flow value. The stabilization time can be stated as a time value, such as a number of seconds. However, the specified values and stabilization time can be stored indirectly also as values or diagrams which are associated with them. In doing so, the second specified value, for example, can be defined simply as a percentage of the first specified value. The stabilization time can be stated as a processing distance, for example, after which the process gas is reduced in accordance with the invention. Storage can be performed in particular by storing on a storage medium, in particular as a part of a processing program or as a reference in a processing programme which is executed to control the processing of the workpiece.

The quantity of process gas per unit of time is set based on the specified values. In particular, the specified values represent time-dependent desired point values for the quantity of process gas per unit of time, or setting values can be derived directly or indirectly from the specified values for the setting device (valves) of the process gas feed. If, for example, an additional regulation of the process gas occurs based on monitoring of the process, the specified values can also serve as basic values by means of which the process gas is adjusted further.

In a preferred variant of the invention, during the entire stabilization time a quantity of process gas per unit of time is supplied to the processing zone, the setting of which is based on the first specified value. Thus, by keeping the application of gas constant, stabilization of the processing zone is assisted.

A particularly preferred embodiment of the invention is characterised in that, after the stabilization time, the quantity of process gas per unit of time fed to the processing zone is reduced gradually during a transitional period from the quantity of process gas per unit of time based on the first specified value to the quantity of process gas per unit of time based on the second specified value. By reducing gradually, the conditions set during the stabilization time do not change abruptly. The risk of a break in flow with negative effects on the stability of the process and, therefore, ultimately on the quality of the processing results is reduced considerably.

It has been shown in practice that a gradual reduction over a transitional period amounts to between 20% and 60% of the stabilization time, preferably between 30% and 50% of the stabilization time.

In the case of a particularly preferred variant, after the stabilization time the quantity of process gas per unit of time fed to the processing zone is reduced, based on a stored ramp function, i.e. the reduction takes place in accordance with a linear function. This produces a variant that is simple to implement from a control standpoint. Linear ramp functions of this type can be constructed easily in a processing program. Optionally it is also possible to access a standard ramp function stored in the control system of a valve.

Advantageously, during the at least nearly complete further welding processing after the reduction, i.e. until the laser beam is switched off, the quantity of process gas per unit of time being fed is set based on the second specified value.

A particular savings in costs results from an advantageous variant of the invention, in which the process gas controlled according to the invention serves to protect the processing point from the ambient air and the process gas is preferably helium, argon, carbon dioxide and/or nitrogen. Naturally, it can be advantageous if not just one process gas but a mixture, in particular, of several process gases from those mentioned above is used as a protective gas mixture.

In a preferred embodiment, as processing is taking place, a second process gas is fed to the processing zone by means of a separate process gas inlet, wherein the supplied quantity of process gas per unit of time of the second process gas is set independently from the quantity of process gas per unit of time of the first process gas. In particular, the second process gas involves a gas which fulfils another and/or additional function than the first process gas. In particular, it can involve, for example, a working gas or a cross jet gas. The optimal quantities per unit of time of these gases are dependent on other conditions or requirements so that a separate control of these process gases results in better processing results.

For the case where several process gases or a process gas mixture are/is used for the same function, e.g. as protective gases, in particular with the same process gas inlet, in a preferred variant the total quantity per unit of time of the process gas mixture which is fed to the processing zone can be reduced after the stabilization time.

However, it is also conceivable in one preferred variant of the invention wherein the total quantity per unit of time of the process gas mixture generally becomes weaker, stays the same or even increases. Thus, it is possible, for example, just to reduce the quantity per unit of time of a process gas after the stabilization while the quantity per unit of time of at least one other process gas increases such that overall the total quantity becomes less, stays constant or even rises. The advantage of this variant is that the flow conditions remain unchanged or can be influenced at least independently of the reduction of a single process gas. In the end, after the stabilization time in this variant, the composition of the process gas mixture changes automatically. When the process gas, whose quantity per unit of time is reduced involves an expensive process gas (such as helium) but the other is cheaper, there is still a considerable reduction in cost.

It is particularly advantageous, without lowering the quality of the processing result, if the invention is used in processing wherein the processing beam acts continuously on the workpiece as it is being processed and performs an operation of essentially the same kind, in particular an associated weld seam.

According to a device-related aspect of the invention, at least a first and at least a second smaller specified value for the quantity of process gas per unit of time, as well as a stabilization time, can be stored, in particular are stored, in the control apparatus for a setting device of the process gas feed to a processing zone. By using the control apparatus according to the invention, the setting device can be controlled such that the supplied quantity of process gas per unit of time is set based on the first specified value at the start of processing and, after the stabilization time during which the workpiece is processed while the processing beam and workpiece move relative to one another, the quantity of process gas per unit of time is set based on the second specified value.

The setting of the quantity of process gas per unit of time is performed preferably by a valve unit, in particular by means of a proportional quantity control valve, connected to the control apparatus, for example, by a bus system. Optionally, the valve unit itself has parts of the control apparatus such as means of storage in which functions, such as ramp functions to change the quantity of process gas per unit of time, are stored.

According to a further aspect of the invention, an apparatus for machine processing, in particular for machine welding processing, of workpieces, in particular of plate-like workpieces, tubes and/or profiles, by means of a thermal processing beam, in particular by means of a laser beam, is provided with a control apparatus according to the invention. Preferably, this is incorporated in a numerical machine control system.

Furthermore, the invention can be inserted advantageously in a processing program for the operation of a machine of this type. In this case, a processing program according to the invention has control commands for the setting device of the process gas feed, the effect of which is that a method according to the invention is performed when the processing program runs on a numerical machine control system.

Finally, the invention can be inserted into a computer program product which has encoding means suitable for performing a method to create a processing program of the above type when the computer program product is run on data processing equipment. The computer program product has an executable computer program in the form of a programming system, offering in particular an automatic input and/or selection option for the first and second specified values as well as for the stabilization times.

Preferably, based on a technological database, the programming system offers suggestions for the specified values and the stabilization time depending on the application or processing which are defined by further process parameters. In particular, an operator can accept or modify the suggestions. The programming system can also have an input capability in which, generally, a choice can be made to operate in process energy-saving mode or to operate without the reduction of the process gas according to the invention.

The invention is explained in more detail below with the aid of diagrammatic drawings. In the drawings:

DETAILED DESCRIPTION

Figure 1:
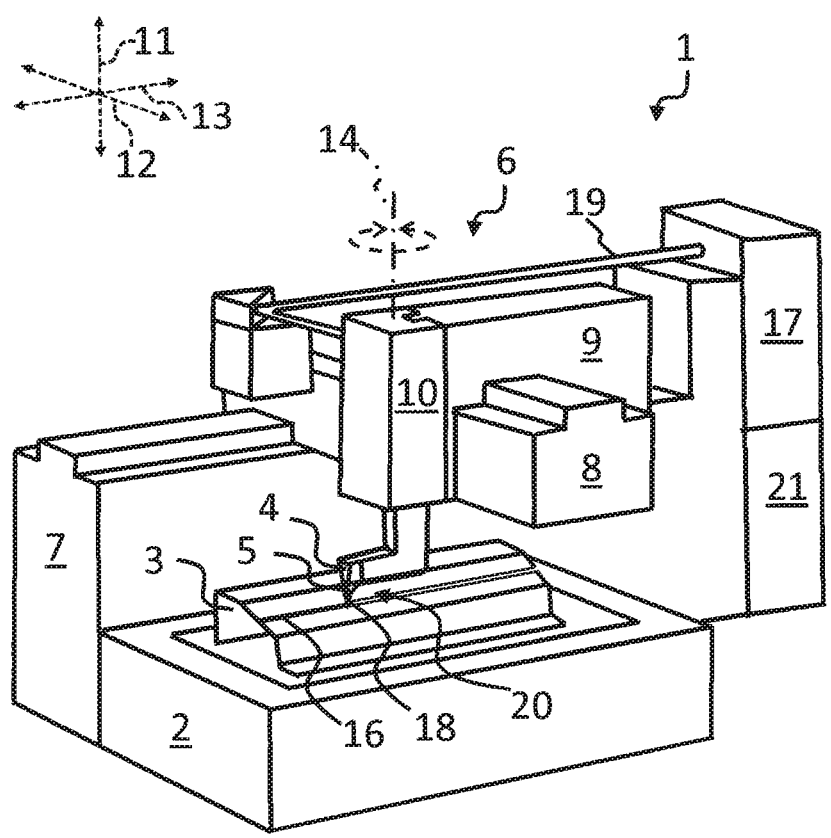
FIG. 1 shows a machine for machine welding processing of workpieces by means of a laser beam.

According to FIG. 1, the machine 1 for the laser welding of, in particular, metal workpieces, has a workpiece support table 2 on which a workpiece 3 is placed during processing, a laser processing head 4 with a laser processing nozzle 5 and a moving unit 6 to move the laser processing nozzle 5 relative to the workpiece 3.

The movement unit 6 is provided on a machine base body 7 and comprises three linearly translatable movement carriages 8, 9, 10, by means of which the laser processing head 4 can be moved about three orthogonally running movement axes 11, 12, 13. The laser processing head 4 can rotate on the carriages about a vertical drive axis 14 and can pivot about a horizontal pivot axis (not shown). The laser processing head 4 or, respectively, the laser processing nozzle 5 can follow relatively freely almost any desired path of a weld seam 16 to be produced along the workpiece 3, by means the movement unit 6.

A supply unit 17 is arranged laterally on the machine base body 7. The supply unit 17 comprises, amongst other things, a laser resonator and at least partially a system for supplying the process gas (not shown). The laser processing beam 18 generated in the laser resonator and the process gases are fed through beam guide and supply lines 19 to the processing zone 20. The numerical machine control 21 which serves to control the apparatus 1 is shown by way of example underneath the supply unit 17.

The illustrated configuration of the machine 1, in particular the configuration of the machine axes and the spatial arrangement of the supply unit 17 and the machine control 21 are merely exemplary in nature. Many variations are conceivable.

FIG. 1 shows the machine 1 during the processing of the workpiece 3. A weld seam 16 is being produced on the workpiece 3 by means of the laser beam 18. The laser beam 18 is moved by means of the movement unit 6 along the movement axis 13 relative to the workpiece 3. In a continuous process—during which the laser beam 18 is neither stopped nor switched off—a continuous weld seam 16 is produced. According to FIG. 1, a first section of the weld seam 16 has been produced already.

Figure 2:
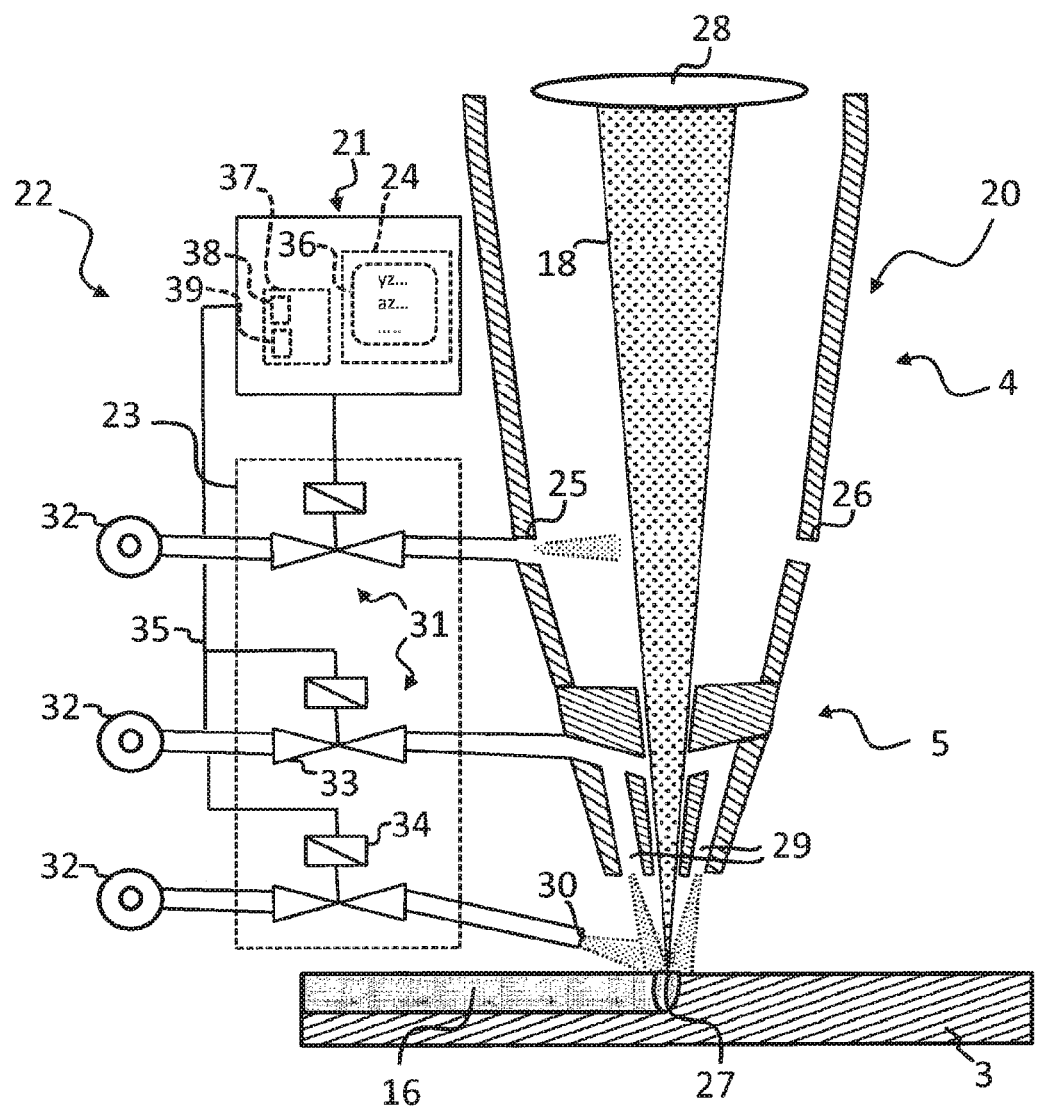
FIG. 2 shows the processing zone and a system for feeding process gas to the machine of FIG. 1.

In FIG. 2, the processing zone 20 of the machine 1 is shown with a section of the laser processing head 4. Also, the system for feeding the process gas 22 including the setting device 23 for the process gas feed and the associated control machine 24 is illustrated highly diagrammatically.

It can be seen from FIG. 2 that the process gas can be fed to the processing zone 20 along three different paths. By using a cross jet nozzle 25, a process gas can flow transversely to the path of the laser beam 18 and leave again through an outlet opening 26 which is simply indicated. The action of the cross jet gas prevents emissions coming from the processing point 27, to which the laser beam 18 is applied to the workpiece 3, and reaching focussing optics in the form of a lens 28 shown further above in FIG. 2.

Another path by which process gas is fed is through process gas ducts 29 in the laser processing nozzle 5. The process gas fed through the ducts 29 flows essentially coaxially to the laser beam 18 to the processing point 27. A working gas for example, such as air, is fed via this feed line.

Lastly, process gas can be fed by means of a laterally arranged gas nozzle 30 which is aligned towards the processing point 27. The process gas fed in this manner or the process gas mixture fed in this manner serves as protective gas. The processing point 27 is shielded effectively from the ambient air by the process gas. The protective gas used can be, for example, helium, argon, nitrogen or carbon dioxide or a mixture of several of these gases.

In order to set the particular quantity of process gases per unit of time which are fed to the processing zone, the nozzles 25, 30 or ducts 29 are connected via a respective proportional control valve unit 31 with respective gas source 32. The proportional control valve units 31 each comprise a proportional control valve 33 and a control unit 34, by means of which the proportional control valve 33 can be controlled by the central machine control 21. (Standard-) control functions, in particular a ramp function for changing the quantity of process gas per unit of time, are stored in the control units 34. The control units 34 are connected in particular via a bus system 35 to the central machine control 21. The proportional control valve units 31 form part of the supply unit 17, for example.

A processing program 36 which executes the welding operation is provided in the machine control 21. The processing program 36 comprises control commands, which determine, in particular, the quantity of process gas per unit of time that is fed to the processing zone. In this respect, the control apparatus 24 of the setting device 23 of the process gas feed is largely incorporated in the numerical apparatus control 21.

Figure 3:
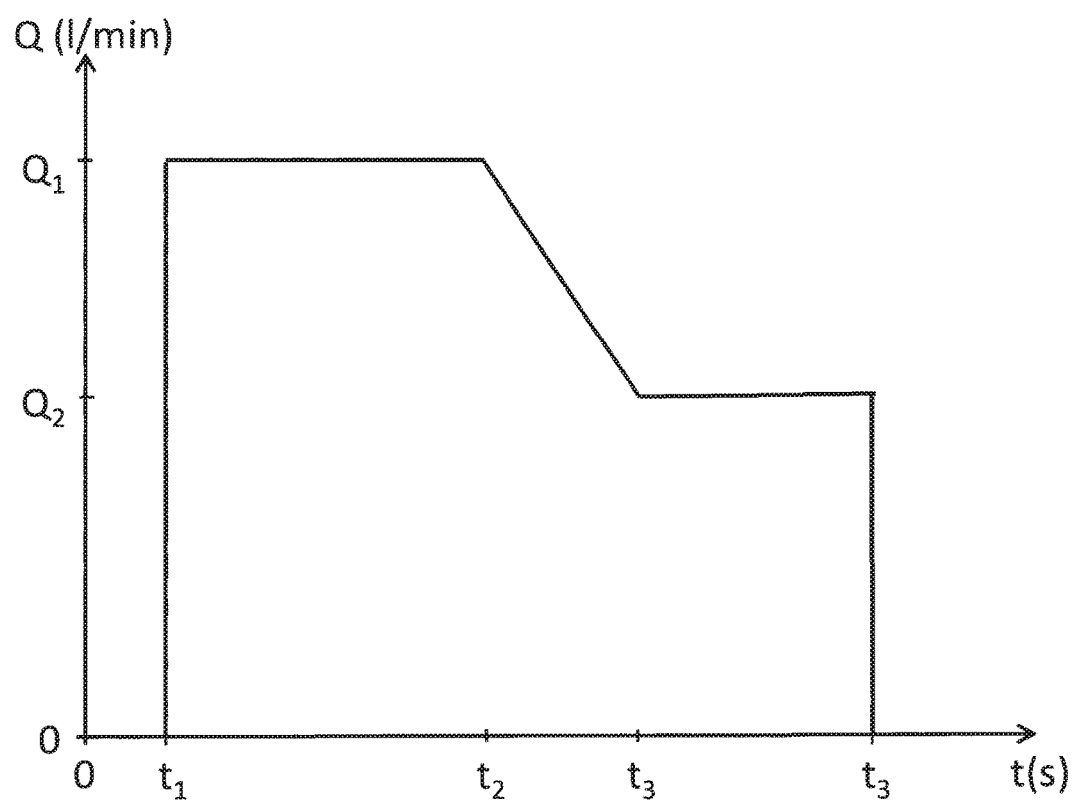
FIG. 3 shows a diagram of the quantity of process gas per unit of time, fed to the processing zone, as a function of the processing time.

In particular, a stabilization time and a first and a second, smaller specified value for the quantity of process gas per unit of time are stored by the processing program 36 in the control apparatus 24 or machine control 21, whereby the process gas is intended to be fed as a protective gas by means of the lateral gas nozzle 30 to the processing zone 20. Based on the specified values and the stabilization time, the proportional valve 33 associated with the gas nozzle 30 is controlled to provide a quantity of process gas per unit of time, an example of which is shown in FIG. 3.

As the processing begins ($t_1$), the laser processing nozzle 5 is positioned over a point where the weld seam 16 to be produced is to start. The laser beam 18 is switched on. The flow of protective gas is started at least almost at the same time. The inflow of protective gas per unit of time ($Q_1$) is set based on the first specified value. The quantity of protective gas per unit of time is 17 l/min, for example.

A first weld seam section is now produced on the workpiece 3 by moving the laser beam 18 along the workpiece 3 until the specified stabilization time finishes ($t_2$). From the start ($t_1$) of the processing, 5 to 6 seconds, for example, may go by until reaching the stabilization time.

Without stopping the movement of the laser beam 18 relative to the workpiece 3 or switching off the laser beam 18, from this point in time the quantity of process gas per unit of time is reduced gradually for a transitional period. The transitional period ends ($t_3$), when the quantity of process gas per unit of time ($Q_2$) is set based on the second specified value. The quantity can be a mere 10 l/min, for example. Accordingly, the quantity of process gas per unit of time can be reduced by 40%, for example. The transitional period lasts for 3 s, for example, that is, between 30% to 50% of the stabilization time.

The remainder of the welding operation is performed with the reduced quantity of process gas per unit of time ($Q_2$). At the end of the welding ($t_3$), the laser beam is switched off and the process gas feed stopped. The length of time during which the reduced quantity of process gas ($Q_2$) per unit of time is fed depends largely on the length of the weld seam 16. When the welding operation has finished, a further welding operation can be carried out at another place on the workpiece 3 and the steps described above are repeated.

If a protective gas mixture is fed through the gas nozzle 30, the total quantity of gas per unit of time can be controlled in an analogous manner. Moreover, it should be mentioned that, during the described processing method, for example, no amount of working gas or an independently controlled quantity of working gas per unit of time and/or no amount of cross jet gas or an independently controlled amount of cross jet gas per unit of time can be fed to the processing zone 20.

A programming system 37 in the form of a computer programme product is also provided in the numerical machine control 21, which has encoding means suitable for performing a method of producing a processing program 36 when the computer program product is operated on the numerical apparatus control 21. The computer programme product can be operated, however, on a separate data processing system and the processing program 36 thereby produced can then be transferred to the machine control 21.

The programming system 37 has an automatic input and/or selection capability 38 for selecting the first and second specified values and for the stabilization time. In particular, the programming system 37 also comprises a technological database 39, in which suggestions for specified values and stabilization times for different applications are stored. The operator can accept or modify the suggestions. The input and/or selection capability 38 can be used in advance to choose between operating in process energy-saving mode or operating without the automatic reduction in the process gas.

A number of embodiments of the invention have been described. Nevertheless, it will be understood that various modifications may be made without departing from the spirit and scope of the invention. Accordingly, other embodiments are within the scope of the following claims.

What is claimed is:

1. A method of machine welding of workpieces using a laser beam, the method comprising:
   welding two workpieces by moving the laser beam and the two workpieces relative to each other;
   feeding an inert gas comprising at least one of helium, argon, carbon dioxide and nitrogen, as a protection gas into a processing zone during the welding process, in which processing zone the laser beam is applied to the workpiece, wherein the protection gas is fed into the processing zone at a first settable quantity of protection gas per unit of time based on a stored first specified value, at the start of welding, wherein the protection gas is configured to shield the processing zone from ambient air; and then,
   after a predetermined stabilization time, in which the welding is continued with the relative movement between the laser beam and the workpiece, feeding the protection gas to the processing zone at a second quantity of protection gas per unit of time, wherein the second quantity of protection gas per unit of time is set based on a stored second specified value that is smaller than the first specified value.

2. The method according to claim 1, wherein the first settable quantity of protection gas per unit of time is fed to the processing zone during the entire predetermined stabilization time set based on the first specified value.

3. The method according to claim 1, further comprising after the stabilization time, reducing the quantity of protection gas per unit of time fed to the processing zone gradually during a transitional period from the first settable quantity of protection gas per unit of time based on the first specified value to the second quantity of protection gas per unit of time based on the second specified value.

4. The method according to claim 3, wherein the transitional period is between 20% and 60% of the predetermined stabilization time.

5. The method according to claim 3, wherein the transitional period is between 30% and 50% of the predetermined stabilization time.

6. The method according to claim 1, further comprising reducing the quantity of protection gas per unit of time fed to the processing zone after the predetermined stabilization time based on a stored ramp function.

7. The method according to claim 1, further comprising feeding the protection gas together with one or more other protection gases in the form of a protection gas mixture to the processing zone to protect the processing point from the ambient air, and, after the stabilization time, reducing the total quantity of protection gas per unit of time of the protection gas mixture based on the first and second specified value.

8. The method according to claim 1, wherein the laser beam acts continuously on the workpiece as the workpiece is being processed to produce a continuous weld seam.

9. A laser welding machine comprising:
   a workpiece support;
   a laser processing head comprising a laser processing nozzle emitting a laser beam and an inert gas comprising at least one of helium, argon, carbon dioxide and nitrogen, as a protection gas; and
   a numerical machine control configured to cause relative movement between a laser beam and a workpiece being welded by the beam, to set the quantity of the protection gas per unit of time fed to a processing zone during the welding process based on a first specified value and, after the stabilization time, during which welding of the workpiece continues with a relative movement between the laser beam and the workpiece, to set the quantity of protection gas per unit of time based fed to a processing zone on the second specified value,
   the numerical machine control further configured to, at the start of the welding, set the quantity of protection gas per unit of time based on the first specified value and, after the stabilization time, during which welding processing of the workpiece continues with a relative movement between the laser beam and the workpiece, set the quantity of protection gas per unit of time based on the second specified value, wherein the protection gas is configured to shield the processing zone from ambient air.

10. One or more non-transitory computer readable media storing instructions that are executable by a processing device, and upon such execution cause the processing device to perform operations during relative movement between a laser beam of a laser welding machine and a workpiece positioned on a workpiece support of the laser welding machine comprising:

causing an inert gas comprising at least one of helium, argon, carbon dioxide and nitrogen, as a protection gas to be fed as a protection gas to a processing zone at a first settable quantity of protection gas per unit of time based on a stored first specified value, at the start of welding processing wherein the protection gas is configured to shield the processing zone from ambient air; and causing the protection gas to be fed to the processing zone at a second quantity of protection gas per unit of time after a predetermined stabilization time, in which the processing of the workpiece is continued with the relative movement between the laser beam and the workpiece, the second quantity of protection gas per unit of time set based on a stored second specified value that is smaller than the first specified value.

* * * * *